(12) United States Patent
Li et al.

(10) Patent No.: US 7,176,565 B2
(45) Date of Patent: Feb. 13, 2007

(54) CAPACITORS HAVING SEPARATE TERMINALS ON THREE OR MORE SIDES

(75) Inventors: Yuan-Liang Li, Chandler, AZ (US); David G. Figueroa, Mesa, AZ (US); Chee-Yee Chung, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 735 days.

(21) Appl. No.: 10/006,188

(22) Filed: Dec. 3, 2001

(65) Prior Publication Data

US 2003/0102523 A1 Jun. 5, 2003

(51) Int. Cl.
*H01L 23/34* (2006.01)

(52) U.S. Cl. ............. 257/723; 257/678; 257/686; 257/690

(58) Field of Classification Search ......... 257/678, 257/686, 690, 723
See application file for complete search history.

(56) References Cited

U.S. PATENT DOCUMENTS 6,327,134 B1 * 12/2001 Kuroda et al. ............. 361/303

* cited by examiner

*Primary Examiner*—Long Pham
(74) *Attorney, Agent, or Firm*—Schwegman, Lundberg, Woessner & Kluth, P.A.

(57) ABSTRACT

A multilayer capacitor comprises separate terminals on at least three sides, and on as many as six sides. The capacitor can be fabricated in a large number of different configurations, types, and sizes, depending upon the target application. The separate terminals that are disposed on different sides of the capacitor can be readily coupled to a variety of different adjacent conductors, such as die terminals (including bumpless terminals or bars), IC package terminals (including pads or bars), and the terminals of adjacent discrete components. Methods of fabrication, as well as application of the capacitor to an electronic assembly, are also described.

7 Claims, 13 Drawing Sheets

US 7,176,565 B2

CAPACITORS HAVING SEPARATE TERMINALS ON THREE OR MORE SIDES

RELATED APPLICATIONS

The present application is related to the following applications which are assigned to the same assignee as the present application:

Ser. No. 10/006,292, entitled "Integrated Circuit Packages With Sandwiched Capacitors", now U.S. Pat. No. 6,900,991; and Ser. No. 11/080,126, entitled "Integrated Circuit Packages With Sandwiched Capacitors".

TECHNICAL FIELD

The inventive subject matter relates generally to electronic components. More particularly, the inventive subject matter relates to a multi-terminal capacitor, to an electronic assembly that includes a multi-terminal capacitor, and to fabrication methods related thereto.

BACKGROUND INFORMATION

Integrated circuits (ICs) are typically assembled into packages by physically and electrically coupling them to a substrate made of organic or ceramic material. One or more ICs or IC packages can be physically and electrically coupled to a substrate such as a printed circuit board (PCB) or card to form an "electronic assembly". The "electronic assembly" can be part of an "electronic system". An "electronic system" is broadly defined herein as any product comprising an "electronic assembly".

Examples of electronic systems include computers (e.g., desktops, laptops, hand-helds, servers, Web appliances, routers, etc.), wireless communications devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders, camcorders, digital cameras, MP3 (Motion Picture Experts Group, Audio Layer 3) players, video games, watches, etc.), and the like.

In the field of electronic systems there is an incessant competitive pressure among manufacturers to increase the performance of their equipment. This is particularly true regarding the packaging of ICs on substrates, where each new generation of packaging must provide increased performance, particularly in terms of an increased number of components and higher clock frequencies, while generally being smaller or more compact in size.

An IC substrate may comprise a number of insulated metal layers selectively patterned to provide metal interconnect lines (referred to herein as "traces"), and one or more electronic components mounted on one or more surfaces of the substrate. The electronic component or components are functionally connected to other elements of an electronic system through a hierarchy of electrically conductive paths that include the substrate traces. The substrate traces typically carry signals that are transmitted between the electronic components, such as ICs, of the system.

As the internal circuitry of high performance ICs, such as processors, operates at higher and higher clock frequencies, noise in the power and ground lines increasingly reaches an unacceptable level. This noise can arise due to inductive and capacitive parasitics, for example, as is well known. To reduce such noise, capacitors known as decoupling or bypass capacitors are often used to provide a stable signal or stable supply of power to the circuitry.

As electronic devices continue to advance, there is an increasing need for higher levels of capacitance at reduced inductance levels for decoupling, power dampening, and supplying charge. In addition, there is a need for capacitance solutions that do not interfere with package connectors of various types, and which do not limit the industry to certain device sizes and packing densities. Accordingly, there is a need in the art for alternative capacitance solutions in the fabrication and operation of electronic devices and their packages.

Many types of capacitors are known in the electronic arts. One known type of capacitor used in electronic assemblies is referred to a "chip capacitor". Chip capacitors are known, for example, in dual-terminal configurations. FIG. 1 is a prior art dual-terminal chip capacitor 1. These are currently available in a number of different sizes, such as "0402", i.e. 0.040"×0.020" (approx. 1.0 mm×0.50 mm). 0402 capacitors typically have a wrap-around terminal on each end, i.e. a terminal 2 or 3 covers each end and a portion of each side. One terminal 2 is of a first polarity, and the other terminal 3 is of a second polarity.

In addition to dual-terminal chip capacitors, another type of chip capacitor is referred to as an "interdigitated capacitor". FIG. 2 is a prior art interdigitated capacitor 4 having several terminals 5–8 on each of two sides. Terminals 5 and 7 are of a first polarity type, and terminals 6 and 8 are of a second polarity type. Terminals of the same polarity type are alternated along two opposing sides of capacitor 4. Interdigitated, multilayer, ceramic capacitors are commercially available from AVX, Myrtle Beach, S.C., whose URL is currently www-avxcorp-com; TDK Corporation, Mount Prospect, Ill., whose URL is currently www-tdk-com; and Murata Electronics, Smyrna, Ga., whose URL is currently www-murata-com. (To avoid inadvertent hyperlinks, the periods in the preceding URLs have been replaced by hyphens.)

Dual-terminal chip capacitors and interdigitated caps, while adequate for many packaging and other electronic applications, are not versatile enough to accommodate the design and performance requirements of many current electronic applications, including the packaging of high performance ICs.

For the reasons stated above, and for other reasons stated below which will become apparent to those skilled in the art upon reading and understanding the present specification, there is a significant need in the art for improved multi-terminal capacitors, for improved electronic assemblies incorporating such multi-terminal capacitors, and for improved methods of fabricating such multi-terminal capacitors and electronic assemblies.

DETAILED DESCRIPTION

In the following detailed description of embodiments of the inventive subject matter, reference is made to the accompanying drawings which form a part hereof, and in which is shown by way of illustration specific preferred embodiments in which the inventive subject matter may be practiced. These embodiments are described in sufficient detail to enable those skilled in the art to practice them, and it is to be understood that other embodiments may be utilized and that structural, mechanical, compositional, and electrical changes may be made without departing from the spirit and scope of the inventive subject matter. The following detailed description is, therefore, not to be taken in a limiting sense, and the scope of the inventive subject matter is defined only by the appended claims.

The inventive subject matter provides a multilayer capacitor that has separate terminals on at least three sides, and on as many as six sides. The capacitors can be fabricated in a large number of different configurations, types, and sizes, depending upon the target application.

The term "separate", as used herein, means that a terminal is not electrically coupled to another terminal via any element that is on the exterior of the capacitor. For example, a terminal that is wrapped around an edge of the capacitor does not thereby form two "separate" terminals. As another example, terminals that are only electrically coupled via an element that is on the interior of the capacitor are "separate" terminals. The term "separate" can apply to terminals that are on the same side, or on different sides, of the capacitor.

For an application, used in a high performance electronic assembly as described in the Related Applications, the capacitors are positioned within the mounting region between a die and an IC package substrate, particularly in a core region containing power conductors. Through this arrangement, capacitors can be placed close to the IC to minimize loop inductance for power delivery, while also minimizing resistance losses. In addition, the use of ceramic capacitors between the IC and the IC package substrate in certain embodiments can provide an improved CTE (coefficient of thermal expansion) match and improved operational reliability.

The capacitor has terminals on at least three sides, and up to six sides. These terminals can be coupled to corresponding adjacent conductors, such as die terminals (including bumpless terminals), IC package terminals (including pads and/or bars), and the terminals of adjacent discrete components (including additional capacitors). Various embodiments of capacitors having separate terminals on three or more sides are illustrated and described herein. Methods of fabrication, as well as application of the capacitors to an electronic assembly, are also described.

Figure 1:
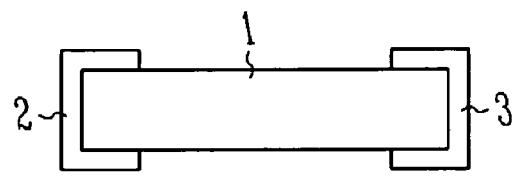
FIG. 1 is a prior art dual-terminal chip capacitor.
Figure 2:
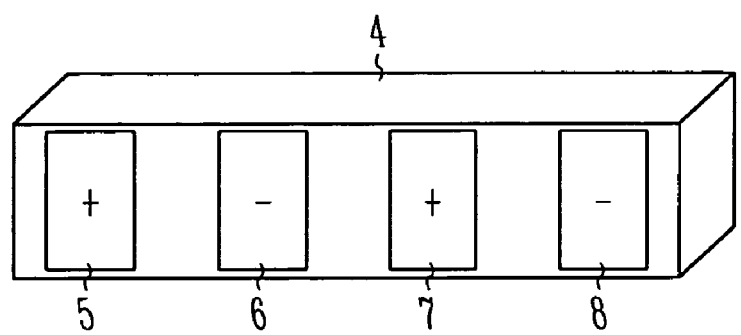
FIG. 2 is a prior art interdigitated capacitor having several terminals on each of two sides.
Figure 3:
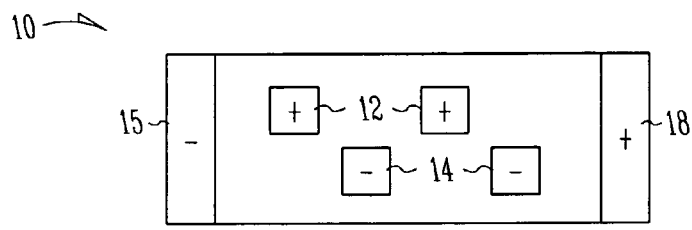
FIG. 3 is a top view of a multi-terminal capacitor having separate terminals on three sides, in accordance with an embodiment of the inventive subject matter.

FIG. 3 is a top view of a multi-terminal capacitor 10 having separate terminals on three sides, in accordance with an embodiment of the inventive subject matter. Capacitor 10 has two terminals 12 of positive polarity and two terminals 14 of negative polarity on its upper surface. Terminals 12 and 14 are "separate" terminals as defined above.

Capacitor 10 has a terminal 16 of negative polarity on its left-hand end (refer to FIG. 5), which terminal 16 has an upper portion 15 that wraps around onto the top of capacitor 10. Capacitor 10 further has a terminal 19 of positive polarity on its right-hand end (refer to FIG. 5), which terminal 19 has an upper portion 18 that wraps around onto the top of capacitor 10. In another embodiment, terminals 16 and 19 do not have portions that wrap onto the top of capacitor 10. Terminals 16 and 19 (FIG. 5) are "separate" terminals.

Figure 4:
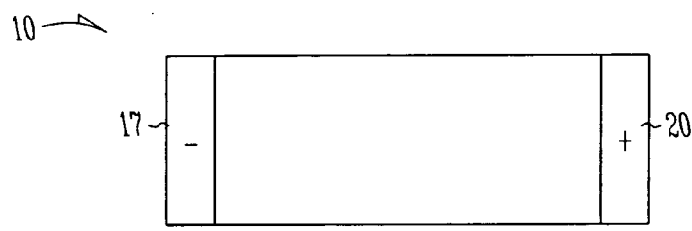
FIG. 4 is a bottom view of the multi-terminal capacitor shown in FIG. 3.

FIG. 4 is a bottom view of the multi-terminal capacitor 10 shown in FIG. 3. In the embodiment illustrated, terminal 16 (refer to FIG. 5) has a lower portion 17 (FIG. 4) that wraps around onto the bottom of capacitor 10. Terminal 19 (refer to FIG. 5) has a lower portion 20 (FIG. 4) that wraps around onto the bottom of capacitor 10. In another embodiment, terminals 16 and 19 do not have portions that wrap onto bottom of capacitor 10.

Figure 5:
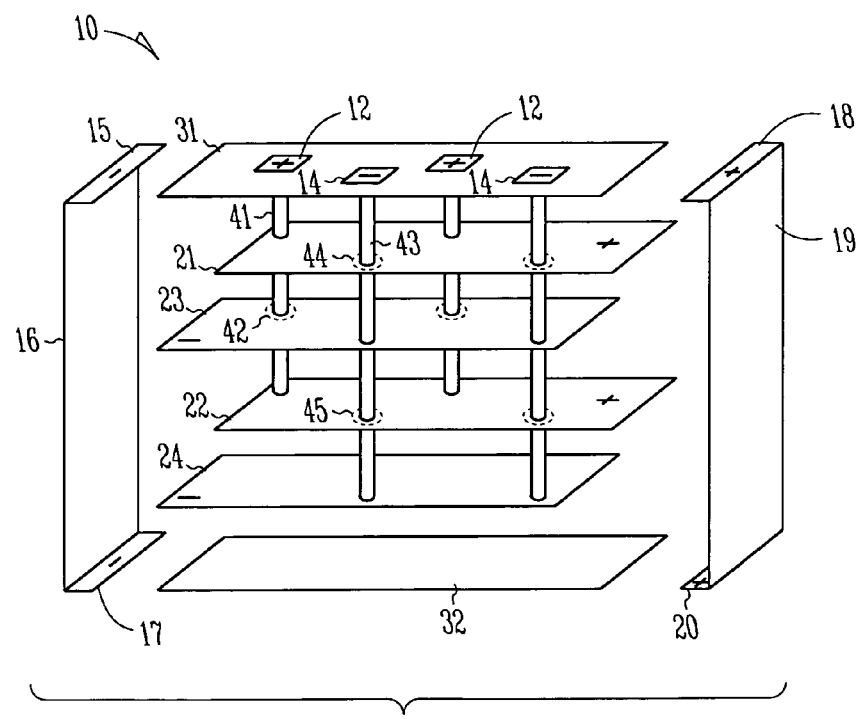
FIG. 5 is an exploded perspective view of the multi-terminal capacitor shown in FIG. 3.

FIG. 5 is an exploded perspective view of the multi-terminal capacitor 10 shown in FIG. 3. Capacitor 10 comprises upper and lower layers 31 and 32, respectively, which may be insulators. Upper layer 31 is often referred to in the art as a "capping layer", and lower layer 32 is often referred to as a "base layer".

Upper layer 31 comprises terminals 12 and 14. Lower layer 32 does not comprise any separate terminals in this embodiment. However, portion 17 of terminal 16 wraps around onto lower layer 32, and portion 20 of terminal 19 wraps around onto lower layer 32.

Capacitor 10 also includes four conductive plates 21-24. Conductive plates 21 and 22 are charge-storing elements to hold an electrical charge of a first polarity, e.g. a positive charge. Conductive plates 23 and 24 are charge-storing elements to hold an electrical charge of a second polarity, e.g. a negative charge. Conductive plates 21–24 can be fabricated of any suitable material. For example, they could be formed of a metal such as copper, aluminum, or of a metal alloy. Conductive plates 21–24 may be separated by a suitable dielectric material, such as plastic, a ceramic, a polymer, glass, or air.

"Suitable", as used herein, means having characteristics that are sufficient to produce the desired result(s). Suitability for the intended purpose can be determined by one of ordinary skill in the art using only routine experimentation.

Conductive plates 21–24 are generally disposed within the interior of the body of capacitor 10. In the embodiment shown in FIG. 5, conductive plates 21 and 22 are offset slightly to the right, so that they make electrical contact with terminal 19 when capacitor 10 is assembled. Similarly, conductive plates 23 and 24 are offset slightly to the left, so that they make electrical contact with terminal 16 when capacitor 10 is assembled.

Terminals 12 on the upper surface of capacitor 10 are electrically coupled to conductive plates 21 and 22 by means of a conductor such as via 41. Via 41 passes through a non-contact or keep-out area 42 of conductive plate 23 without electrically contacting conductive plate 23. Similarly, terminals 14 on the upper surface of capacitor 10 are electrically coupled to conductive plates 23 and 24 by means of a conductor such as via 43, which passes through keep-out areas 44 and 45 of conductive plates 21 and 22, respectively. Vias 41 and 43 can be of any suitable type, geometry, and composition.

Referring to FIG. 5, although one terminal of each polarity is illustrated on the ends of capacitor 10, and two terminals of each polarity are illustrated on the top of capacitor 10, capacitor 10 could have more separate terminals of the same and/or opposite polarity on its ends, and capacitor 10 could have fewer separate terminals on its top. For example, capacitor 10 could have only one terminal 12 and only one terminal 14 on its top.

Figure 6:
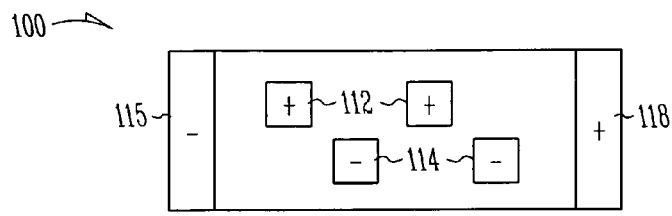
FIG. 6 is a top view of a multi-terminal capacitor having separate terminals on four sides, in accordance with an embodiment of the inventive subject matter.

FIG. 6 is a top view of a multi-terminal capacitor 100 having separate terminals on four sides, in accordance with an embodiment of the inventive subject matter. Capacitor 100 has two terminals 112 of positive polarity and two terminals 114 of negative polarity on its top. Terminals 112 and 114 are "separate" terminals as defined above.

Capacitor 100 has a terminal 116 of negative polarity on its left-hand end (refer to FIG. 8), which terminal 116 has an upper portion 115 that wraps around onto the top of capacitor 100. Capacitor 100 further has a terminal 119 of positive polarity on its right-hand end (refer to FIG. 8), which terminal 119 has an upper portion 118 that wraps around onto the top of capacitor 100. In another embodiment, terminals 116 and 119 do not have portions that wrap onto the top of capacitor 100. Terminals 116 and 119 (FIG. 8) are "separate" terminals.

Figure 7:
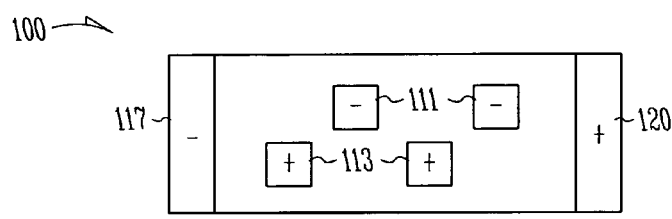
FIG. 7 is a bottom view of the multi-terminal capacitor shown in FIG. 6.

FIG. 7 is a bottom view of the multi-terminal capacitor 100 shown in FIG. 6. Capacitor 100 has two terminals 111 of negative polarity and two terminals 113 of positive polarity on its lower surface. Terminals 111 and 113 are "separate" terminals as defined above.

In the embodiment illustrated, terminal 116 (refer to FIG. 8) has a lower portion 117 (FIG. 7) that wraps around onto the bottom of capacitor 100. Terminal 119 (refer to FIG. 8) has a lower portion 120 (FIG. 7) that wraps around onto the bottom of capacitor 100. In another embodiment, terminals 116 and 119 do not have portions that wrap onto bottom of capacitor 100.

Figure 8:
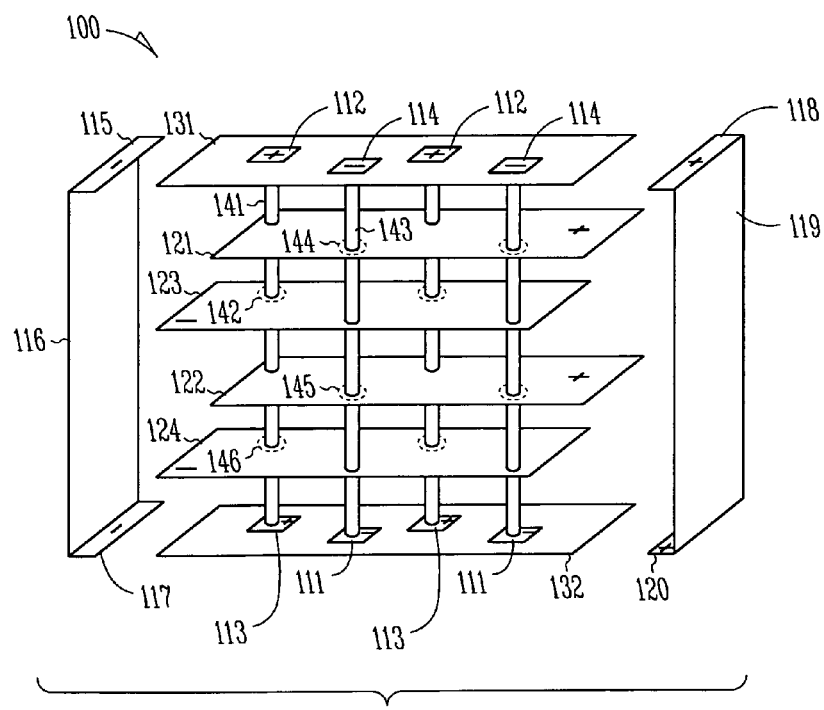
FIG. 8 is an exploded perspective view of the multi-terminal capacitor shown in FIG. 6.

FIG. 8 is an exploded perspective view of the multi-terminal capacitor 100 shown in FIG. 6. Capacitor 100 comprises upper and lower layers 131 and 132, respectively, which may be insulators. Upper layer 131 comprises terminals 112 and 114. Lower layer 132 does not comprise any separate terminals in this embodiment. However, portion 117 of terminal 116 wraps around onto lower layer 132, and portion 120 of terminal 119 wraps around onto lower layer 132.

Capacitor 100 also includes four conductive plates 121–124. Conductive plates 121 and 122 are charge-storing elements to hold an electrical charge of a first polarity, e.g. a positive charge. Conductive plates 123 and 124 are charge-storing elements to hold an electrical charge of a second polarity, e.g. a negative charge. Conductive plates 121–124 can be fabricated of any suitable material, such as a metal like copper, aluminum, nickel, silver, gold, tin, or a metal alloy, such as tin-lead, silver-lead, or silver-paladium. Conductive plates 121–124 may be separated by a suitable dielectric material, such as any of those mentioned earlier.

Conductive plates 121–124 are generally disposed within the interior of the body of capacitor 100. In the embodiment shown in FIG. 8, conductive plates 121 and 122 are offset slightly to the right, so that they make electrical contact with terminal 119 when capacitor 10 is assembled. Similarly, conductive plates 123 and 124 are offset slightly to the left, so that they make electrical contact with terminal 116 when capacitor 100 is assembled.

Terminals 112 on the upper surface of capacitor 100 are electrically coupled to conductive plates 121 and 122, and to terminals 113 on the lower surface of capacitor 100, by means of a conductor such as via 141. Via 141 passes through non-contact or keep-out areas 142 and 146 of conductive plates 121 and 123, respectively, without electrically contacting conductive plates 121 or 123. Similarly, terminals 114 on the upper surface of capacitor 100 are electrically coupled to conductive plates 123 and 124, and to terminals 111 on the lower surface of capacitor 100, by means of a conductor such as via 143, which passes through keep-out areas 144 and 145 of conductive plates 121 and 122, respectively.

Referring to FIG. 8, although one terminal of each polarity is illustrated on the ends of capacitor 100, and two terminals of each polarity are illustrated on the top and bottom of capacitor 100, capacitor 100 could have more separate terminals of the same and/or opposite polarity on its ends, and capacitor 100 could have fewer separate terminals on its top and/or bottom. For example, capacitor 100 could have only single terminals 112 and terminal 114 on its top, and only single terminals 111 and 113 on its bottom.

Figure 9:
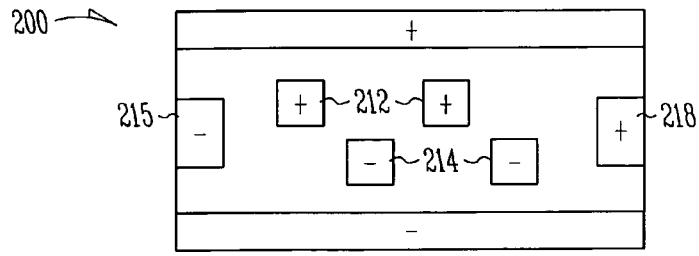
FIG. 9 is a top view of a multi-terminal capacitor having separate terminals on six sides, in accordance with an embodiment of the inventive subject matter.

FIG. 9 is a top view of a multi-terminal capacitor 200 having separate terminals on six sides, in accordance with an embodiment of the inventive subject matter. Capacitor 200 has two terminals 212 of positive polarity and two terminals 214 of negative polarity on its top. Terminals 212 and 214 are "separate" terminals as defined above.

Capacitor 200 has a terminal 216 of negative polarity on its left-hand end (refer to FIG. 11), which terminal 216 has an upper portion 215 that wraps around onto the top of capacitor 200. Capacitor 200 further has a terminal 219 of positive polarity on its right-hand end (refer to FIG. 11), which terminal 219 has an upper portion 218 that wraps around onto the top of capacitor 200.

In addition, capacitor 200 has a terminal 252 of positive polarity on its back side (refer to FIG. 11), which terminal 252 has an upper portion 251 that wraps around onto the top of capacitor 200. Capacitor 200 further has a terminal 254 (only a portion of which is illustrated) of negative polarity on its front side (refer to FIG. 11), which terminal 254 can have an upper portion (not shown) that wraps around onto the top of capacitor 200.

In another embodiment, terminals 216 and 219 do not have portions that wrap onto the top of capacitor 200. Terminals 216, 219, 252, and 254 (FIG. 11) are "separate" terminals. Thus capacitor 200 has separate terminals on six different sides. If a capacitor having separate terminals on five sides is desired, then separate terminals can be omitted from one of the sides.

Figure 10:
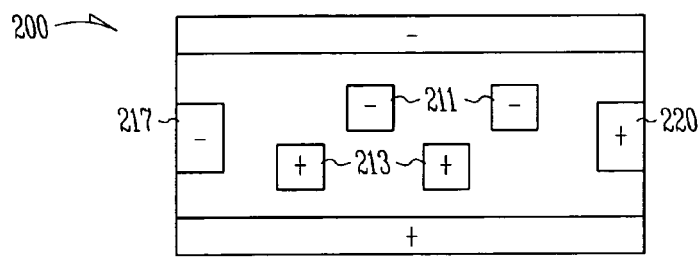
FIG. 10 is a bottom view of the multi-terminal capacitor shown in FIG. 9.

FIG. 10 is a bottom view of the multi-terminal capacitor 200 shown in FIG. 9. Capacitor 200 has two terminals 211 of negative polarity and two terminals 213 of positive polarity on its lower surface. Terminals 211 and 213 are "separate" terminals as defined above.

In the embodiment illustrated, terminals 216 and 219 (refer to FIG. 11) have lower portions 217 and 220, respectively, that wrap around onto the bottom of capacitor 200. Also, terminals 251 and 254 (refer to FIG. 11) have lower portions 253 and 255, respectively, that wrap around onto the bottom of capacitor 200. In another embodiment, terminals 216, 219, 251, and 254 do not have portions that wrap onto bottom of capacitor 200.

Figure 11:
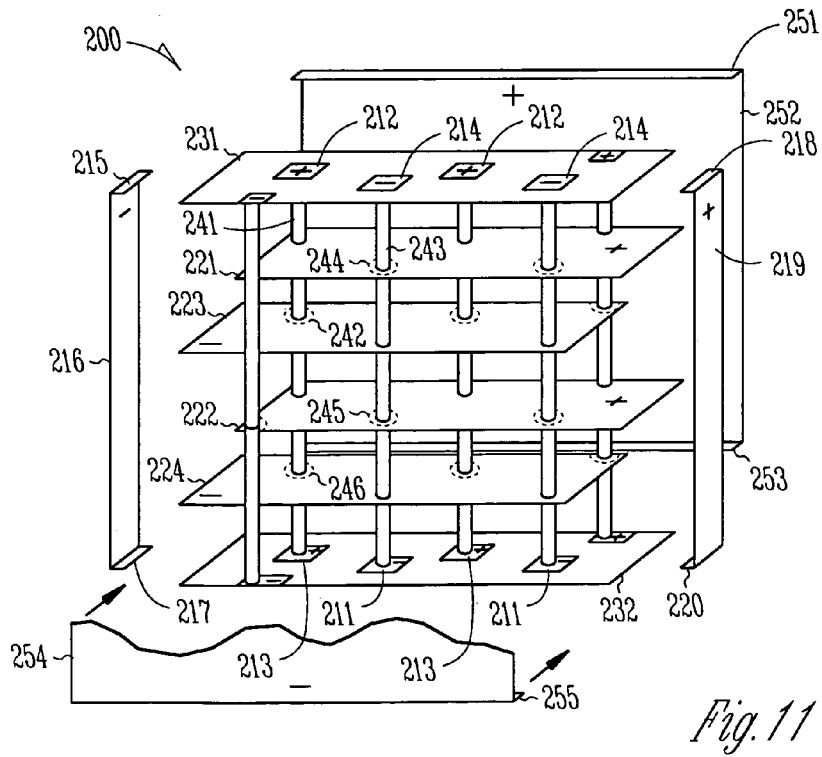
FIG. 11 is an exploded perspective view of the multi-terminal capacitor shown in FIG. 9.

FIG. 11 is an exploded perspective view of the multi-terminal capacitor 200 shown in FIG. 9. Capacitor 200 comprises upper and lower layers 231 and 232, respectively, which may be insulators. Upper layer 231 comprises terminals 212 and 214. Lower layer 232 comprises terminals 211 and 213.

Capacitor 200 also includes four conductive plates 221–224. Conductive plates 221 and 222 are charge-storing elements to hold an electrical charge of a first polarity, e.g. a positive charge. Conductive plates 223 and 224 are charge-storing elements to hold an electrical charge of a second polarity, e.g. a negative charge. Conductive plates 221–224 can be fabricated of any suitable material, such as a metal like copper, aluminum, or a metal alloy. Conductive plates 221–224 may be separated by a suitable dielectric material, such as any of those mentioned earlier.

Conductive plates 221–224 are generally disposed within the interior of the body of capacitor 200. In the embodiment shown in FIG. 11, conductive plates 221 and 222 are offset slightly to the right, so that they make electrical contact with terminal 219 when capacitor 200 is assembled. Similarly, conductive plates 223 and 224 are offset slightly to the left, so that they make electrical contact with terminal 216 when capacitor 200 is assembled. In addition, conductive plates 221 and 222 can be offset slightly towards the rear, so that they make electrical contact with terminal 252 when capacitor 200 is assembled. Likewise, conductive plates 223 and 224 can be offset slightly towards the front, so that they make electrical contact with terminal 254 when capacitor 200 is assembled.

Terminals 212 on the upper surface of capacitor 200 are electrically coupled to conductive plates 221 and 222, and to terminals 213 on the lower surface of capacitor 200, by means of a conductor such as via 241. Via 241 passes through non-contact or keep-out areas 242 and 246 of conductive plates 221 and 223, respectively, without electrically contacting conductive plates 221 or 223. Similarly, terminals 214 on the upper surface of capacitor 200 are electrically coupled to conductive plates 223 and 224, and to terminals 211 on the lower surface of capacitor 200, by means of a conductor such as via 243, which passes through keep-out areas 244 and 245 of conductive plates 221 and 222, respectively.

Referring to FIG. 11, although one terminal of each polarity is illustrated on the front, back, and ends of capacitor 200, and two terminals of each polarity are illustrated on the top and bottom of capacitor 200, capacitor 200 could have more separate terminals of the same and/or opposite polarity on its front, back, and ends, and capacitor 200 could have fewer separate terminals on its top and bottom. For example, capacitor 200 could have only single terminals 212 and terminal 214 on its top, and only single terminals 211 and 213 on its bottom.

Figure 12:
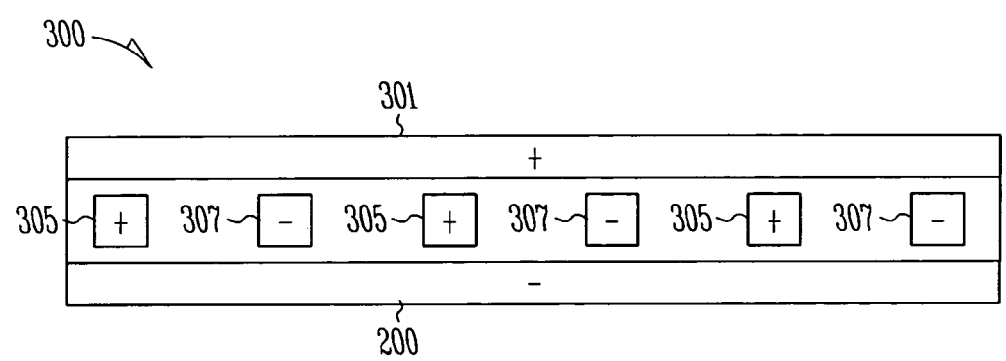
FIG. 12 is a top view of a multi-terminal capacitor having separate terminals on at least three sides, in accordance with an embodiment of the inventive subject matter.

FIG. 12 is a top view of a multi-terminal capacitor 300 having separate terminals on at least three sides, in accordance with an embodiment of the inventive subject matter. On one surface, capacitor 300 has six terminals that include three terminals 305 of positive polarity and three terminals 307 of negative polarity. On a second surface, capacitor 300 has a separate terminal 301 of positive polarity, and on a third surface, capacitor 300 has a separate terminal 303 of negative polarity. Although the embodiment shown in FIG. 12 comprises terminals 301 and 303 on opposite sides of capacitor 300, in other embodiments the separate terminals could be on any side. Also, although capacitor 300 comprises terminals 301 and 303 having portions that wrap onto the same side as terminals 305 and 307, in another embodiments terminals 301 and 303 do not wrap onto the same side as other separate terminals. The internal structure of capacitor 300 can be similar to that shown for capacitor 100.

Figure 13:
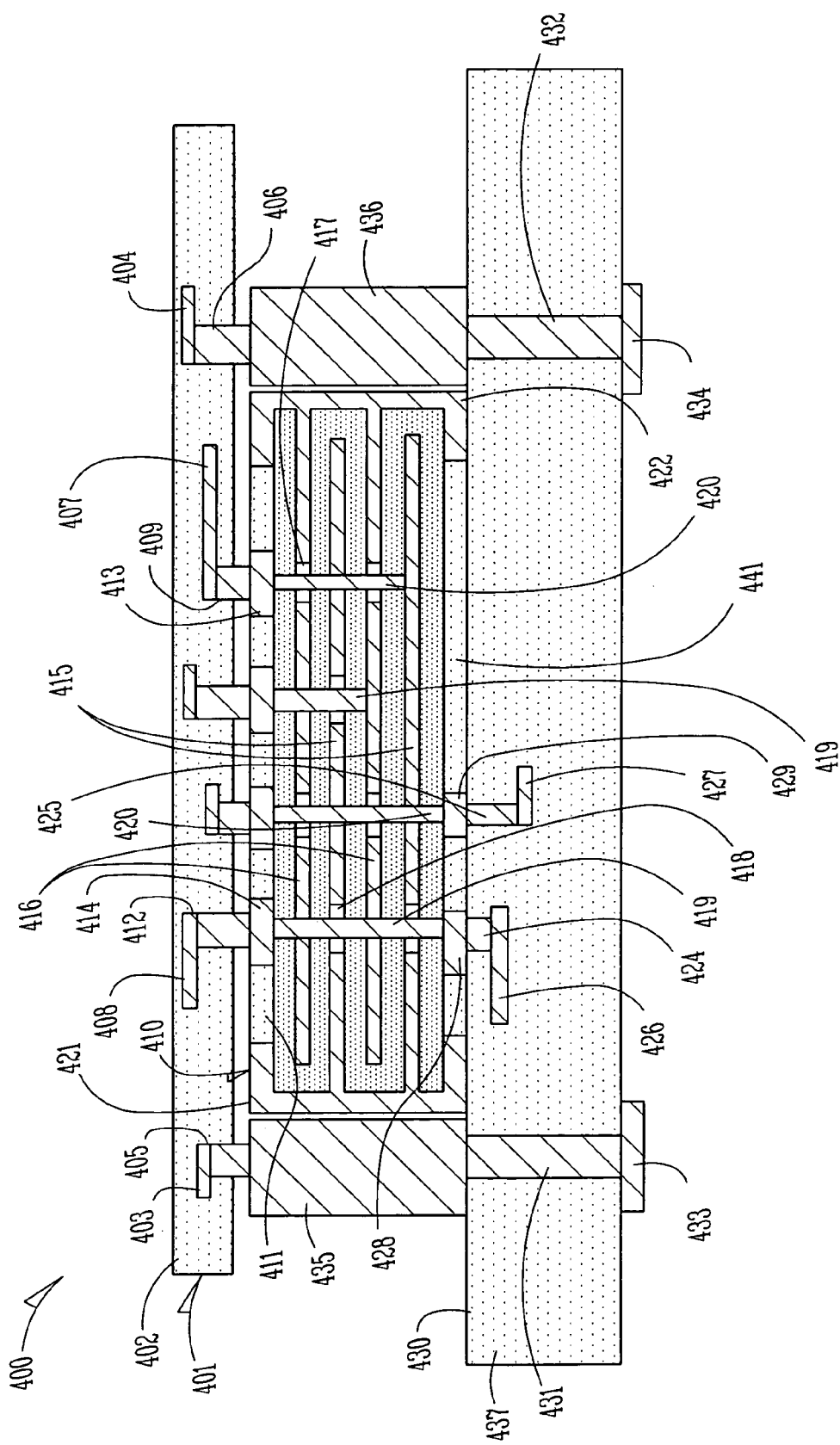
FIG. 13 illustrates a cross-sectional representation of an electronic assembly, including an electrical element, a multi-terminal capacitor having separate terminals on at least three sides, and a substrate, in accordance with an embodiment of the inventive subject matter.

FIG. 13 illustrates a cross-sectional representation of an electronic assembly 400, including an electrical element 401, a multi-terminal capacitor 410 having separate terminals on at least three sides, and a substrate 430, in accordance with an embodiment of the inventive subject matter. Electronic assembly 400 illustrates merely one of many possible embodiments in which capacitors having separate terminals on three or more sides can be combined with a substrate, an electrical element, or both.

In this embodiment, capacitor 410 comprises separate terminals on at least four sides. Namely, capacitor 410 comprises a first terminal 421 on its left-hand end, and capacitor 410 comprises a second terminal 422 on its right-hand end. In addition, capacitor 410 comprises a plurality of terminals 413 and 414 in or on its upper surface, and capacitor 410 comprises a plurality of terminals 428 and 429 in or on its lower surface. In this embodiment, the upper and lower surfaces of capacitor 410 are fabricated from suitable electrical insulators 411 and 441, respectively.

Internally, capacitor 410 comprises a plurality of charge-storing plates 415 and 416. Plates 415 are to store charge having a first polarity, and plates 416 are to store charge having a second polarity.

Terminal 421 is electrically coupled to plates 415. Terminals 413 and 429 are also electrically coupled to plates 415 by means of conductors or vias 420. Vias 420 pass through non-contact or keep-out areas, such as keep-out areas 417, in plates 416.

Terminal 422 is electrically coupled to plates 416. Terminals 414 and 428 are also electrically coupled to plates 416 by means of conductors or vias 419. Vias 419 pass through non-contact or keep-out areas, such as keep-out areas 418, in plates 415.

In this embodiment, electrical element 401 comprises a substrate 402 of electrically insulating material. Electrical element 401 further comprises a plurality of terminals, including terminals 405, 406, 409, and 412. Terminals 405, 406, 409, and 412 can be of any suitable type, including conductive bumps or conductive bars. The terminals of electrical element 401 can be electrically coupled to corresponding conductors or traces of electrical element 401. For example, terminal 405 is coupled to trace 403; terminal 412 is coupled to trace 408; terminal 409 is coupled to trace 407; and terminal 406 is coupled to trace 404. Substrate 402 can comprise one or more layers of traces. Many other configurations of terminals and traces are possible, depending upon the particular application.

Electrical element 401 is an electrical component that can perform any type of function. In one embodiment, electrical element 401 is a processor integrated circuit (IC), which can be of any type, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), or any other type of processor or processing circuit. Other types of electrical elements 401 include a custom circuit, an application-specific integrated circuit (ASIC), a communications circuit, and a wireless filter circuit.

In addition, electrical element 401 can be another capacitor having separate terminals on three or more sides. In such embodiment, electrical element 401 can be identical to or different from capacitor 410.

Still referring to the embodiment of FIG. 13, substrate 430 can be a printed circuit board (PCB) comprising one or more layers of traces within an insulating material 437. Substrate 430 comprises a plurality of terminals, including terminals 424, 425, 435, and 436 on or in its upper surface. Terminals 424, 425, 435, and 436 can be of any suitable type, including conductive pads or bars. In the embodiment shown, terminals 424 and 425 are conductive pads, and terminals 435 and 436 are conductive bars (referred to in some embodiments as "Alternative Bump Metallurgy" (ABM)).

The terminals of substrate 430 can be electrically coupled to corresponding conductors or traces of substrate 430. For example, conductive bars 435 and 436 are coupled to conductors 431 and 432, respectively, which in turn are coupled to terminals 433 and 434, respectively, on the lower surface of substrate 430. Terminals 424 and 425 are coupled to traces 426 and 427, respectively.

As mentioned above, electronic assembly 400 can be implemented in many different forms. In one embodiment, electronic assembly 400 comprises capacitor 410 electrically coupled to electrical element 401. In this embodiment, terminals (such as terminals 413 and 414) on the upper surface of capacitor 410 are electrically coupled to corresponding terminals (such as terminals 412 and 409) on electrical element 401. In addition, separate terminals on opposite sides of capacitor 410 (such as terminals 421 and 422) are electrically coupled to corresponding terminals on electrical element 401. In this embodiment, the conductive bars 435 and 436 would be formed on and as part of electrical element 401 rather than on and as part of substrate 430.

In another embodiment, electronic assembly 400 comprises capacitor 410 electrically coupled to substrate 430. In this embodiment, terminals (such as terminals 428 and 429) on the lower surface of capacitor 410 are electrically coupled to corresponding terminals (such as terminals 424 and 425) on substrate 430. In addition, separate terminals on opposite sides of capacitor 410 (such as terminals 421 and 422) are electrically coupled to corresponding terminals on substrate 430. In this embodiment, terminals 421 and 422 of capacitor 410 are electrically coupled to conductive bars 435 and 436, respectively, of substrate 430.

In yet another embodiment, electronic assembly 400 comprises capacitor 410 electrically coupled to both electrical element 401 and to substrate 430. In such embodiment, the terminals (such as terminals 428 and 429) on the lower surface of capacitor 410 are electrically coupled to corresponding terminals (such as terminals 424 and 425) on or in the upper surface of substrate 430. Terminals on opposite ends of capacitor 410 (such as terminals 421 and 422) are electrically coupled to conductive bars 435 and 436, respectively, which can be formed on and as part of either substrate 430 or electrical element 401. Terminals (such as terminals 413 and 414) on the upper surface of capacitor 410 are electrically coupled to corresponding terminals (such as terminals 412 and 409) of electrical element 401. In addition, in an embodiment wherein conductive bars 435 and 436 are formed on and as part of substrate 430, terminals 405 and 406 of electrical element 401 are electrically coupled to conductive bars 435 and 436, respectively, of substrate 430.

The terminals of the electrical element 401, of the capacitor 410, and of the substrate 430 can be formed of any suitable material, including metals or metal alloys known to those of ordinary skill in the art, such as lead, solder, copper, silver, aluminum, gold, etc.

Figure 14A:
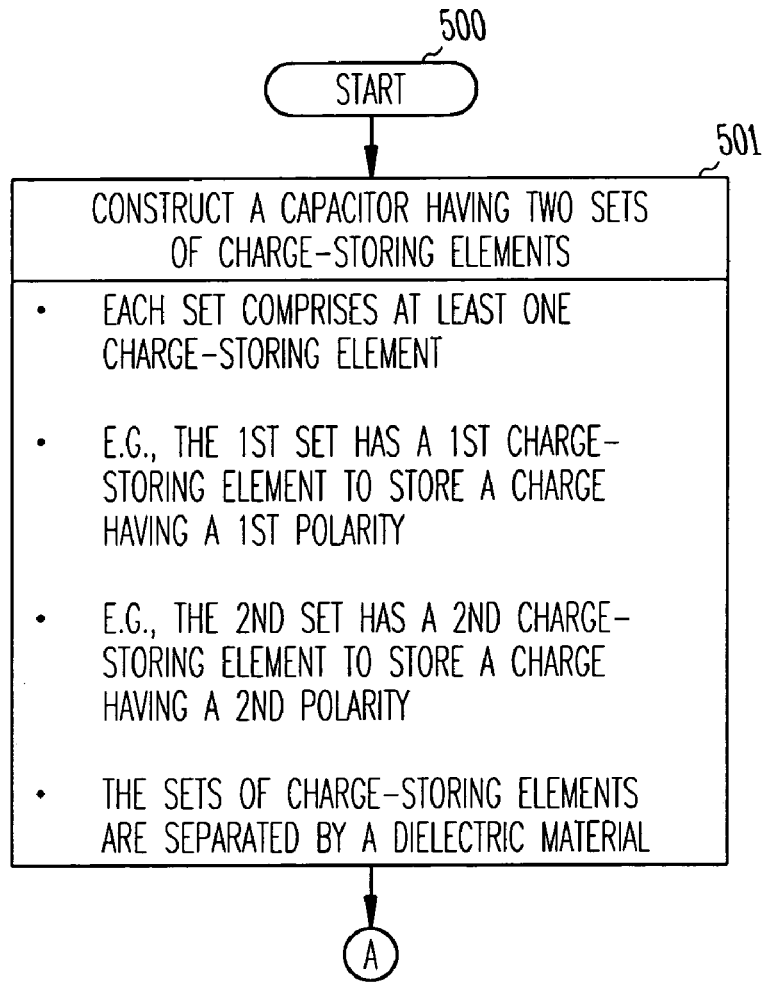
FIGS. 14A and 14B together illustrate a flow diagram of a method of fabricating a multi-terminal capacitor having separate terminals on three or more sides, in accordance with an embodiment of the inventive subject matter.
Figure 14B:
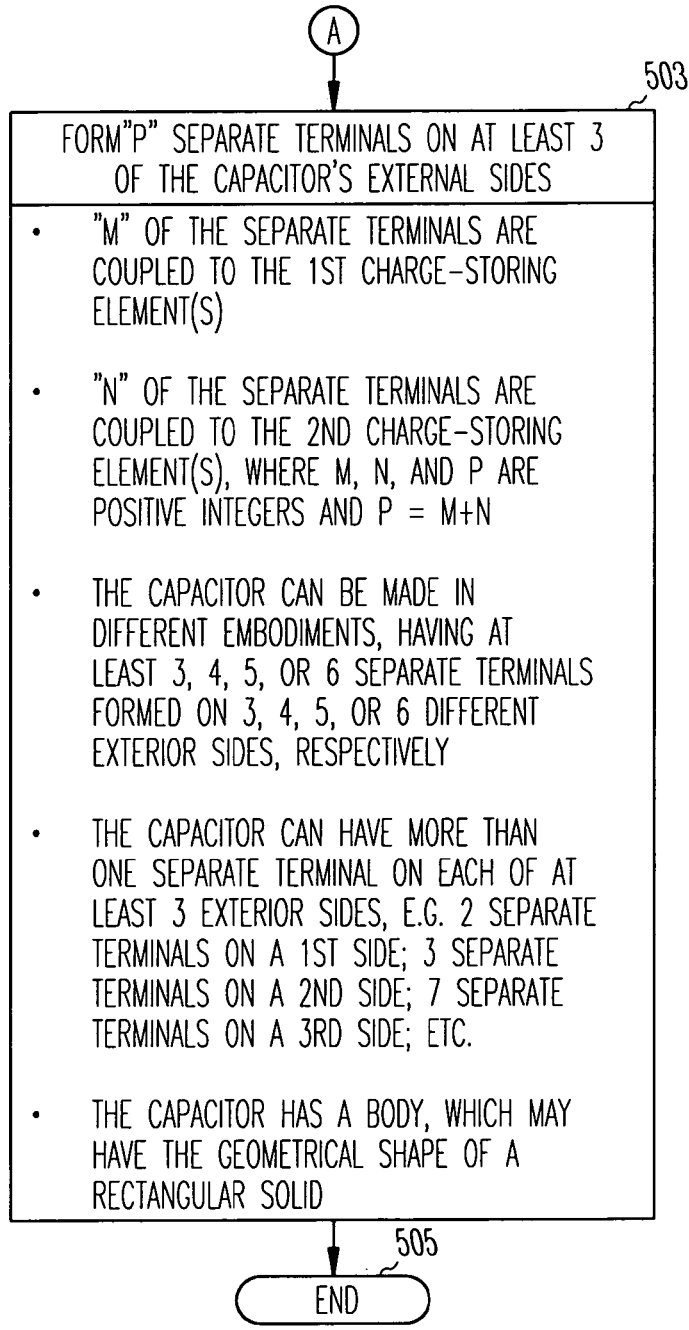

FIGS. 14A and 14B together illustrate a flow diagram of a method of fabricating a multi-terminal capacitor having separate terminals on three or more sides, in accordance with an embodiment of the inventive subject matter. The method starts at 500.

In 501, a capacitor is constructed having two sets of charge-storing elements. Each set comprises at least one charge-storing element. For example, a first set of charge-storing elements has a first charge-storing element to store a charge having a first polarity, e.g. a positive polarity. A second set of charge-storing elements has a second charge-storing element to store a charge having a second polarity, e.g. a negative polarity. The sets of charge-storing elements are separated by a dielectric material, such as any of those mentioned earlier.

In 503, P separate terminals are formed on at least three of the external sides of the capacitor. M of the P separate terminals are coupled to the first charge-storing element(s). N of the P separate terminals are coupled to the second charge-storing elements(s). "M", "N", and "P" are positive integers, and P=M+N. For example, with reference to FIG. 11, there are 4 separate terminals on the upper surface of capacitor 200, 4 separate terminals on the lower surface, and separate terminals on each of the left, right, front, and back sides, giving a total of P=12 separate terminals. M=6 of the 12 terminals are coupled to a first set of charge-storing elements (e.g. plates 221 and 22), and N=6 of the 12 terminals are coupled to a second set of charge-storing elements (e.g. plates 223 and 224)

The capacitor can be made in different embodiments, having at least 3, 4, 5, or 6 separate terminals formed on 3, 4, 5, or 6 different exterior sides, respectively, of the capacitor. For example, FIG. 5 illustrates an embodiment having separate terminals on 3 sides. FIG. 8 illustrates an embodiment having separate terminals on 4 sides. And FIG. 11 illustrates embodiments having separate terminals on either 5 or 6 sides.

The capacitor can have more than one separate terminal on each of at least 3 exterior sides. For example, one exterior side could have 2 separate terminals; another side could have 3 separate terminals; a third exterior side could have 7 separate terminals; a fourth exterior side could have just 1 separate terminal; and so forth.

The capacitor has a body, which may have any suitable geometrical shape. In one embodiment, e.g. as shown in FIG. 5, the capacitor body has the geometrical shape of a rectangular solid. However, other geometrical solids are possible, such as cylinders, truncated cones, trapezoidal solids, free-form solids, and the like. The method ends at 505.

Figure 15A:
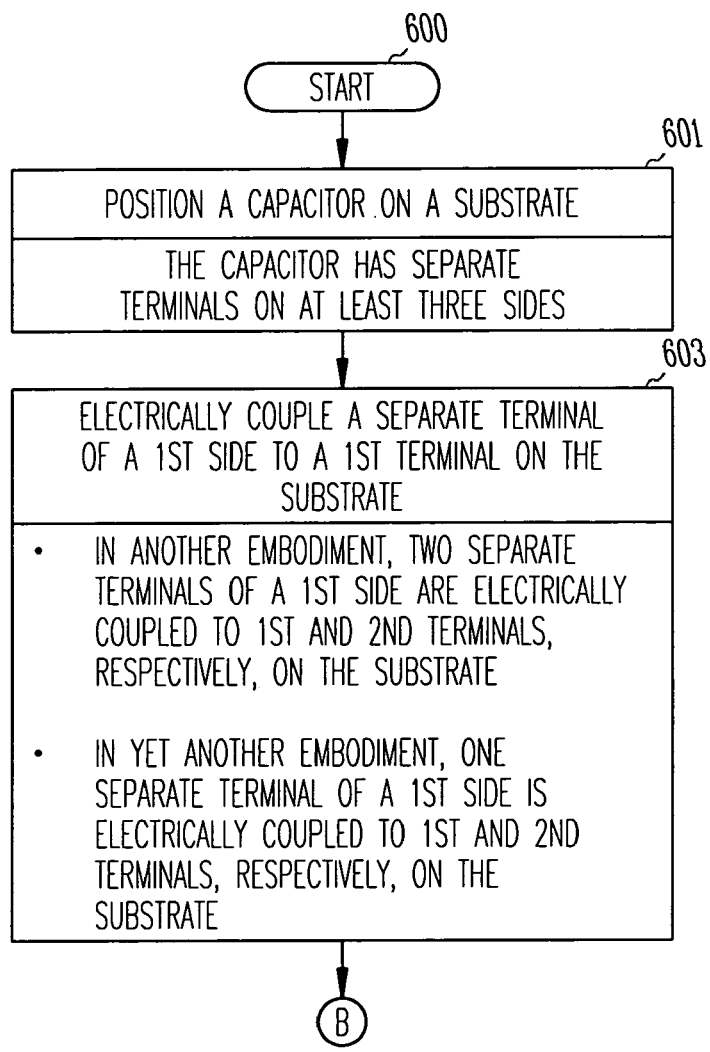
FIGS. 15A and 15B together illustrate a flow diagram of a method of fabricating an electronic assembly comprising a substrate and a multi-terminal capacitor having separate terminals on three or more sides, in accordance with an embodiment of the inventive subject matter.
Figure 15B:
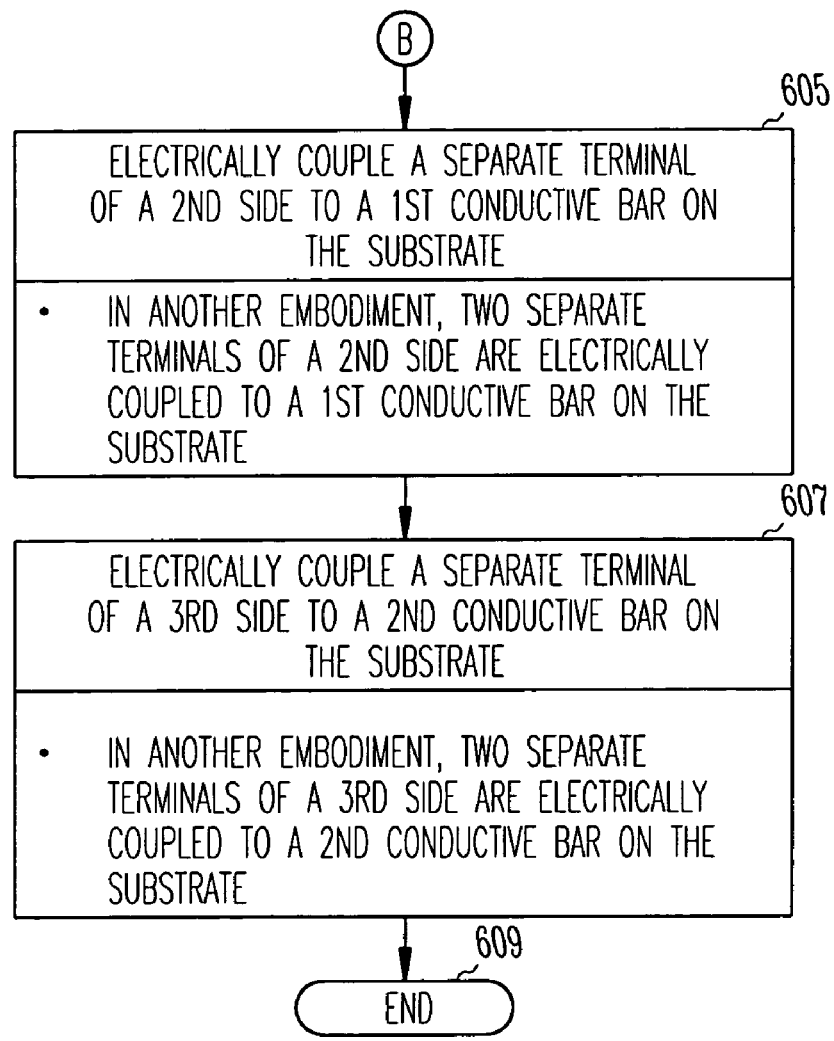

FIGS. 15A and 15B together illustrate a flow diagram of a method of fabricating an electronic assembly comprising a substrate and a multi-terminal capacitor having separate terminals on three or more sides, in accordance with an embodiment of the inventive subject matter. The method starts at 600.

At 601, a capacitor having separate terminals on at least 3 sides is positioned with respect to a substrate.

At 603, a separate terminal of a first side is electrically coupled to a first terminal on the substrate. In another embodiment (e.g. that shown in FIG. 13), 2 separate terminals (428, 429) of a first side are electrically coupled to first and second terminals (424, 425), respectively, on the substrate. In yet another embodiment, one separate terminal of a first side is electrically coupled to first and second terminals, respectively, on the substrate. For example, one bar-shaped terminal of a first side of the capacitor can be electrically coupled to several pads on the substrate.

At 605, a separate terminal of a second side is electrically coupled to a first conductive bar on the substrate. For example, with reference to FIG. 13, terminal 421 is electrically coupled to conductive bar 435. In another embodiment, 2 separate terminals of a second side are electrically coupled to a first conductive bar on the substrate. For example, 2 separate terminals of a second side of the capacitor can be electrically coupled to a first conductive bar on the substrate.

At 607, a separate terminal of a third side is electrically coupled to a second conductive bar on the substrate. For example, with reference to FIG. 13, terminal 422 is electrically coupled to conductive bar 436. In another embodiment, 2 separate terminals of a third side are electrically coupled to a second conductive bar on the substrate. For example, 2 separate terminals of a third side of the capacitor can be electrically coupled to a second conductive bar on the substrate. The method ends at 609.

Figure 16A:
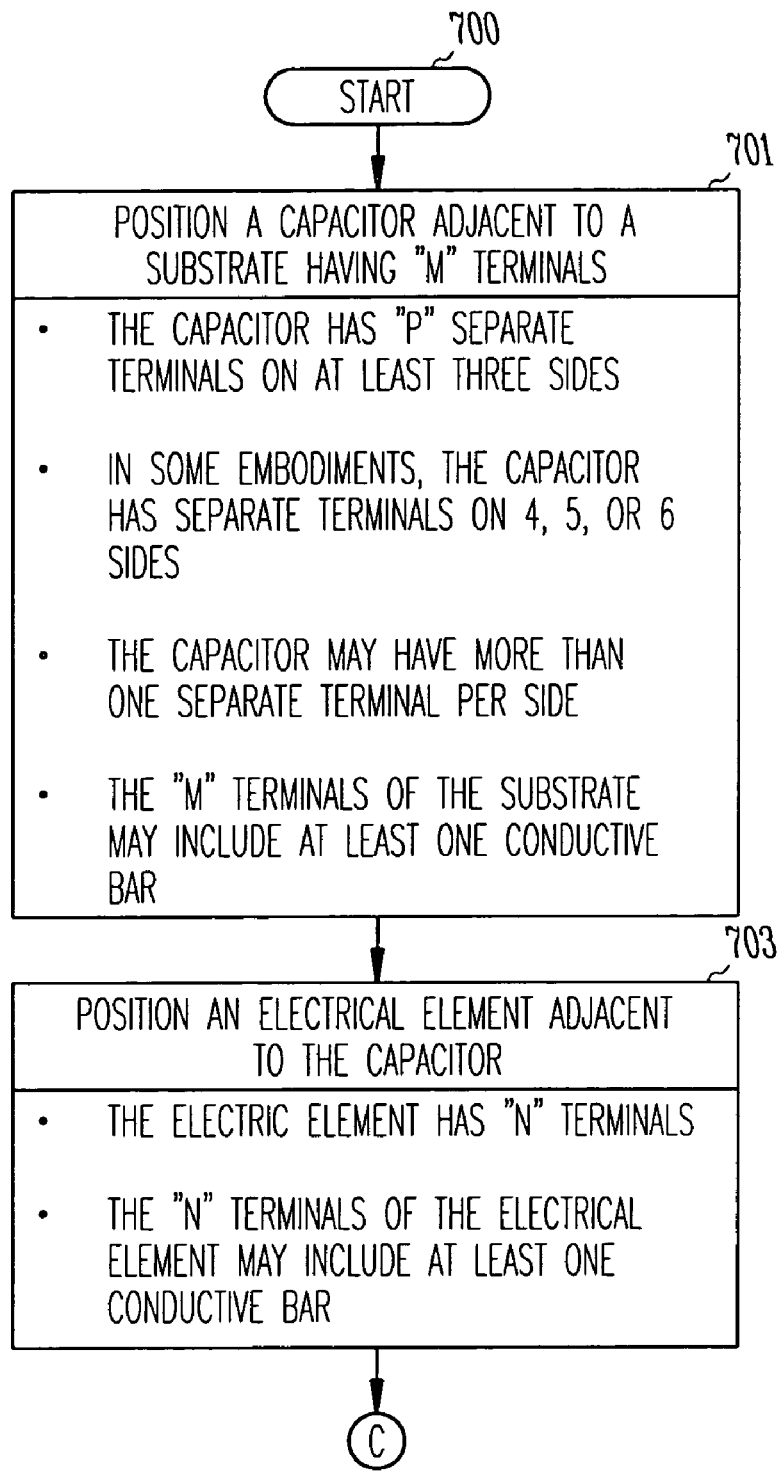
FIGS. 16A, 16B, and 16C together illustrate a flow diagram of a method of fabricating an electronic assembly comprising a substrate, an electrical element, and a multi-terminal capacitor having separate terminals on three or more sides, in accordance with an embodiment of the inventive subject matter.
Figure 16B:
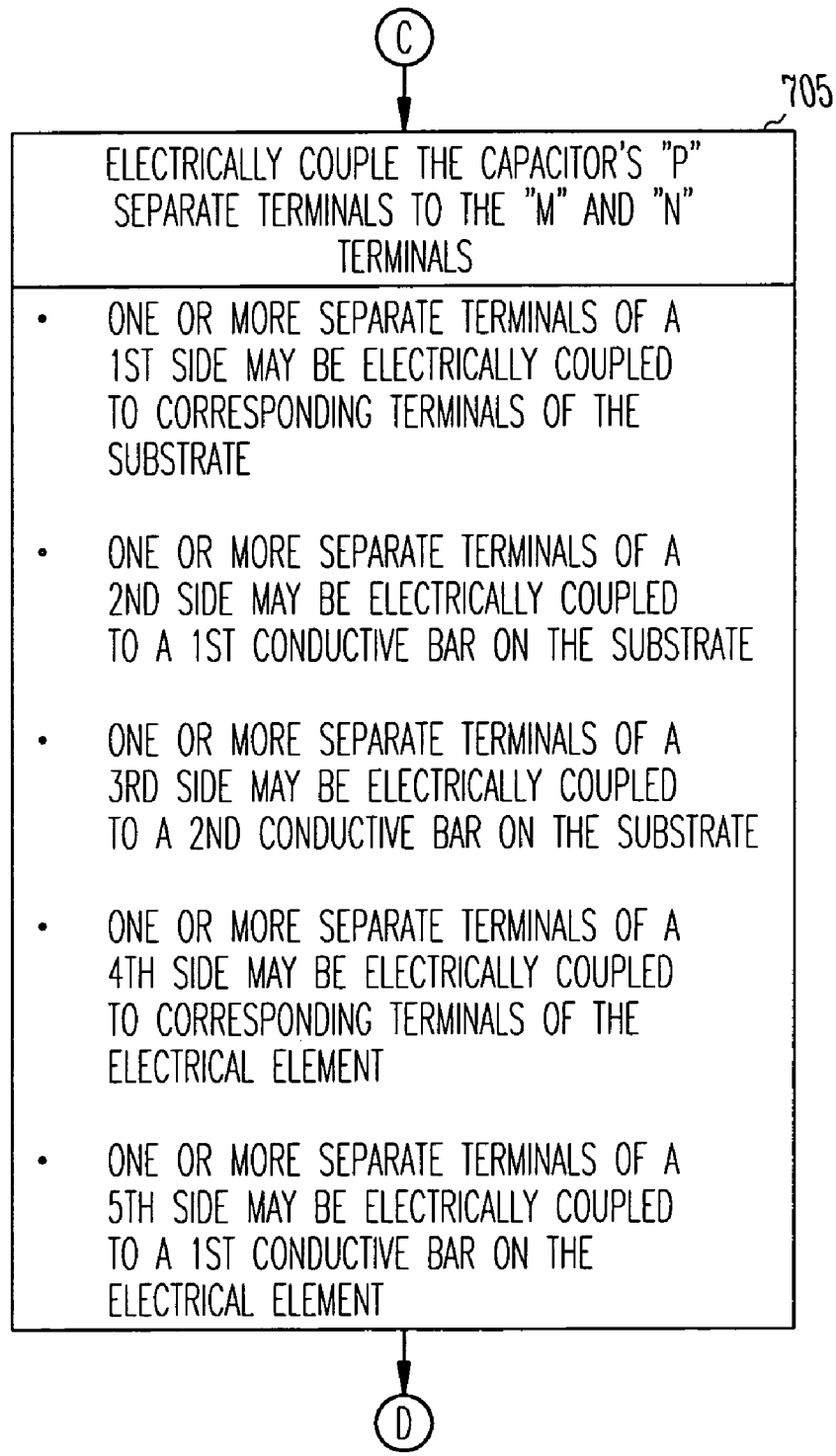
Figure 16C:
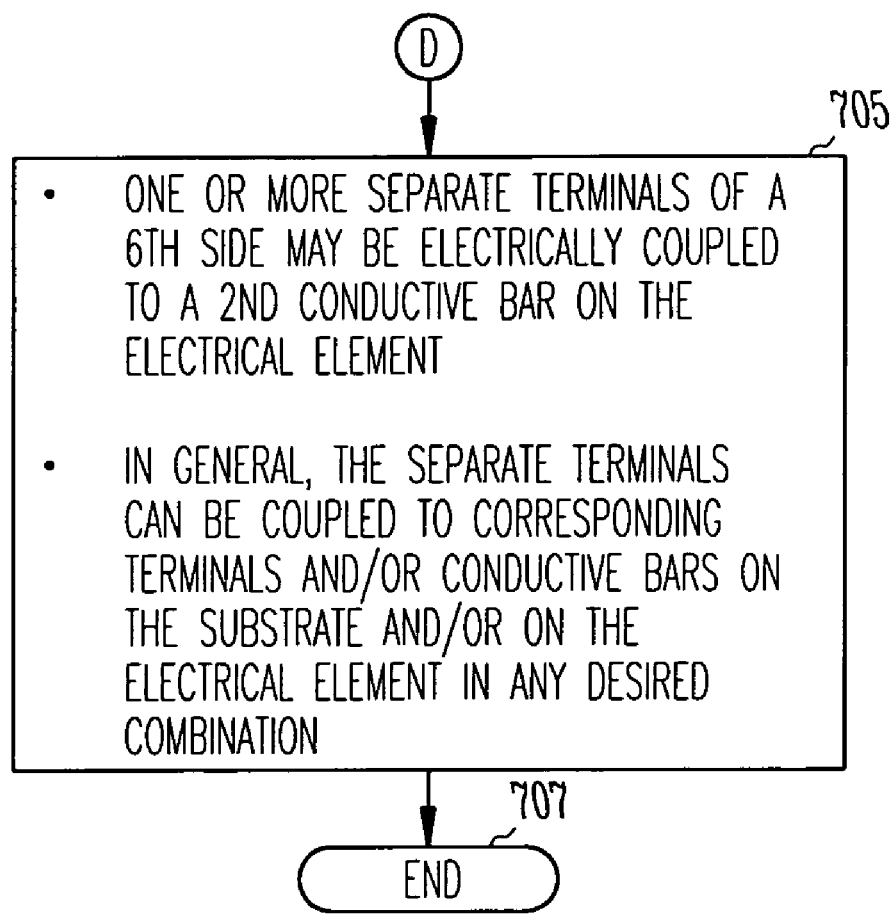

FIGS. 16A, 16B, and 16C together illustrate a flow diagram of a method of fabricating an electronic assembly comprising a substrate, an electrical element, and a multi-terminal capacitor having separate terminals on three or more sides, in accordance with an embodiment of the inventive subject matter. The method starts at 700.

At 701, a capacitor having "P" separate terminals on at least 3 exterior sides is positioned adjacent to a substrate having "M" terminals. In some embodiments, the capacitor has separate terminals on 4, 5, or 6 sides. The capacitor may have more than one separate terminal per side. The M terminals on the substrate may include at least one conductive bar.

At 703, an electrical element, such as electrical element 401 in FIG. 13, is positioned adjacent to the capacitor. The electrical element has "N" terminals. The N terminals of the electrical element may include at least one conductive bar.

At 705, the capacitor's P separate terminals are electrically coupled to the M terminals on the substrate and to the N terminals of the electrical element. This can be done in many different ways, depending upon the arrangement of terminals on the capacitor, and upon the arrangement of terminals, including conductive bars, on the substrate and on the electrical element.

In one embodiment, one or more separate terminals of a first side of the capacitor may be electrically coupled to corresponding terminals of the substrate. One or more separate terminals of a second side may be electrically coupled to a first conductive bar on the substrate. One or more separate terminals of a third side may be electrically coupled to a second conductive bar on the substrate. One or more conductive terminals of a fourth side may be electrically coupled to corresponding terminals of the electrical element. One or more separate terminals of a fifth side may be electrically coupled to a first conductive bar on the electrical element. One or more separate terminals of a sixth side may be electrically coupled to a second conductive bar on the electrical element. That is, both the substrate and the electrical element could have one or more conductive bars in or on their respective surfaces, to which separate terminals of the same or different sides of the capacitor could be electrically coupled.

Many combinations of capacitor terminals, of electrical element terminals, and of substrate terminals are possible besides those shown and described. In general, the separate terminals can be coupled to corresponding terminals and/or conductive bars on the substrate and/or on the electrical element in any desired combination. The method ends at 707

The operations described above with respect to the methods illustrated in FIGS. 14A–B, 15A–B, and 16A–C can be performed in a different order from those described herein.

The above-described and illustrated details relating to the number, arrangement, dimensions, and types of terminals, electrical elements, substrates, and other constituent parts are merely exemplary of the embodiments illustrated, and they are not meant to be limiting. Further, the assembly operations and sequencing can be varied by one of ordinary skill in the art to optimize the fabrication and performance of the capacitor and/or electronic assembly.

FIGS. 1–13 are merely representational and are not drawn to scale. Certain proportions thereof may be exaggerated, while others may be minimized. The drawings are intended to illustrate various implementations of the inventive subject matter that can be understood and appropriately carried out by those of ordinary skill in the art.

The inventive subject matter present invention provides for a multilayer capacitor that has separate terminals on at least three sides, and on as many as six sides. The capacitors can be fabricated in a large number of different configurations, types, and sizes, depending upon the desired end use application.

In embodiments, described in the Related Applicationsm, the capacitors provide high-speed, low inductance capacitive decoupling in an integrated circuit (IC) package, in which the capacitors are positioned within the mounting region between a die and an IC package substrate.

In another embodiment, a capacitor, having separate terminals on at least three different sides, is mounted on a substrate, and an electrical element can optionally be mounted on the capacitor. Alternatively, the capacitor could be mounted on the electrical element alone.

In yet another embodiment, a capacitor, having separate terminals on up to six different sides, is mounted between conductive bars on a substrate surface, and the capacitor may be electrically coupled to the conductive bars, to one or more terminals on the substrate, to one or more terminals of an electrical element, and to one or more terminals of adjacent capacitors. Alternatively, the capacitor could be mounted between conductive bars on the surface of an electrical element. Or the capacitor could be mounted between conductive bars that are on both the substrate and on the electrical element.

The separate terminals that are disposed on different sides of the capacitor can be readily coupled to a variety of different adjacent conductors, such as die terminals (including bumpless terminals), IC package terminals (including pads and/or bars), and the terminals of adjacent discrete components (including additional capacitors). In addition to the types of terminals described above, any other suitable terminals could be used. The terminals can have any desired geometry, location on the component, and composition.

Methods of fabrication, as well as application of the capacitors to an electronic assembly, are also described.

The inventive subject matter present invention allows electronic assemblies with high performance ICs to be operated at increased clock frequencies and with higher reliability. An electronic assembly and/or electronic system that incorporates one or more capacitors of the inventive subject matter can handle the relatively high power densities and clock frequencies associated with high performance ICs, and such assemblies and/or systems are therefore more commercially attractive.

As shown herein, the inventive subject matter can be implemented in a number of different embodiments, including various types of capacitors, an electronic assembly, and various methods of fabricating a capacitor and an electronic assembly. Other embodiments will be readily apparent to those of ordinary skill in the art. The elements, materials, geometries, dimensions, and sequence of operations can all be varied to suit particular manufacturing and packaging requirements.

While certain structures or operations have been described herein relative to the reader's perspective, such as "top" or "bottom", "upper" or "lower", "left" or "right", "front" or "rear", and so forth, it will be understood that these descriptors are relative, and that they would be reversed if the particular structure being described, e.g. a capacitor, IC, substrate, or package, were inverted, rotated, or viewed in mirror-image. Therefore, these terms are not intended to be limiting.

The inventive subject matter is not to be construed as limited to use in IC packages, and it can be used with any other type of electronic package where the herein-described features of the inventive subject matter provide an advantage.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the inventive subject matter. Therefore, it is manifestly intended that this inventive subject matter be limited only by the claims and the equivalents thereof.

What is claimed is:

1. A capacitor comprising:
    a body having an interior and a plurality of exterior sides;
    a first element to hold an electrical charge of a first polarity;
    a second element to hold an electrical charge of a second polarity;
    first and second terminals coupled to the first and second elements, respectively, and disposed on first and second ones of the plurality of exterior sides;
    at least one conductor within the interior;
    at least one additional conductor within the interior;
    a third terminal coupled to the first element and disposed on a third one of the plurality of exterior sides, wherein the third terminal is electrically coupled to the first terminal only via the first element and the at least one conductor;
    a fourth terminal coupled to the second element and disposed on a fourth one of the plurality of exterior sides, wherein the fourth terminal is electrically coupled to the second terminal only via the second element; and
    a fifth terminal coupled to the second element and disposed on a fifth one of the plurality of exterior sides, wherein the fifth terminal is electrically coupled to the second terminal only via the second element and the at least one additional conductor.

2. The capacitor recited in claim 1, wherein the third and fifth exterior sides are on opposite sides of the body.

3. The capacitor recited in claim 1, wherein the first and second elements are within the interior.

4. The capacitor recited in claim 1, wherein the first element is separated from the second element by a dielectric material.

5. The capacitor recited in claim 1, wherein the body has a geometrical shape of a rectangular solid.

6. The capacitor recited in claim 1 and further comprising:
    a sixth terminal coupled to the first element and disposed on a sixth one of the plurality of exterior sides, wherein the sixth terminal is electrically coupled to the first terminal only via the first element.

7. The capacitor recited in claim 6, wherein the fourth and sixth exterior sides are on opposite sides of the body.

* * * * *